US012688549B2

(12) United States Patent
Ollila et al.

(10) Patent No.: US 12,688,549 B2
(45) Date of Patent: Jul. 21, 2026

(54) PASS THROUGH USING COMMON IMAGE SENSOR FOR COLOUR AND DEPTH

(71) Applicant: Varjo Technologies Oy, Helsinki (FI)

(72) Inventors: Mikko Ollila, Tampere (FI); Mikko Strandborg, Hangonkylä (FI)

(73) Assignee: Varjo Technologies Oy, Helsinki (FI)

( * ) Notice: Subject to any disclaimer, the term of this patent is extended or adjusted under 35 U.S.C. 154(b) by 315 days.

(21) Appl. No.: 18/397,178

(22) Filed: Dec. 27, 2023

(65) Prior Publication Data

US 2025/0217926 A1     Jul. 3, 2025

(51) Int. Cl.
| | |
|---|---|
| *G06T 3/4015* | (2024.01) |
| *G03B 13/36* | (2021.01) |
| *G06T 7/50* | (2017.01) |
| *G06T 7/90* | (2017.01) |

(52) U.S. Cl.
CPC ............ G06T 3/4015 (2013.01); G03B 13/36 (2013.01); G06T 7/50 (2017.01); G06T 7/90 (2017.01); *G06T 2207/10024* (2013.01)

(58) Field of Classification Search
CPC ........... G06T 3/4015; G06T 7/50; G06T 7/90; G06T 2207/10024; G03B 13/36
See application file for complete search history.

(56) References Cited

U.S. PATENT DOCUMENTS

| | | | |
|---|---|---|---|
| 2017/0264811 A1* | 9/2017 | Ollila | H04N 23/672 |
| 2025/0086752 A1* | 3/2025 | Patel | H04N 23/843 |
| 2025/0199607 A1* | 6/2025 | Hu | G02B 27/0172 |
| 2025/0217926 A1* | 7/2025 | Ollila | G06T 7/90 |

FOREIGN PATENT DOCUMENTS

WO     WO-2024167571 A1 *   8/2024   ............. H04N 23/71

* cited by examiner

*Primary Examiner* — Henok Shiferaw
*Assistant Examiner* — Woo C Rhim
(74) *Attorney, Agent, or Firm* — Ziegler IP Law Group, LLC.

(57) ABSTRACT

Disclosed is an imaging system with image sensor and processor(s). The image sensor has a plurality of photo-sensitive cells and a colour filter array. The processor(s) is configured to read out unprocessed colour data from those photo-sensitive cells that correspond to the colour filters of the at least three different colours; generate coarse depth data by processing data read out from at least one of: those photo-sensitive cells that correspond to the colour filters that allow the at least one infrared wavelength to pass through the PDAF photo-sensitive cells; perform interpolation and demosaicking on the unprocessed colour data and the coarse depth data, using at least one neural network, to generate a full-resolution colour data and a full-resolution depth data; and reproject the full-resolution colour data from a given camera pose to a given eye pose of a user, by utilising the full-resolution depth data.

12 Claims, 3 Drawing Sheets

202
READ UNPROCESSED COLOR DATA

204
GENERATE COARSE DEPTH DATA

206
INTERPOLATION AND DEMOSAICKING

208
REPROJECT FULL RESOLUTION COLOR DATA

PASS THROUGH USING COMMON IMAGE SENSOR FOR COLOUR AND DEPTH

TECHNICAL FIELD

The present disclosure relates to imaging systems for pass through using a common image sensor for colour and depth. Moreover, the present disclosure also relates to methods for passing through using the common image sensor for colour and depth.

BACKGROUND

Nowadays, with an increase in number of images being captured every day, there is an increased demand for developments in image processing. Such a demand is quite high and critical in case of evolving technologies such as immersive extended-reality (XR) technologies.

However, existing image processing apparatuses and techniques have several limitations associated therewith. For example, the existing apparatuses and techniques exhibit the requirement of stereo rectification at an initial stage and further a depth is required to be calculated from colour images, especially of output images that are generated after in-sensor processing (ISP) of raw image data that enhances the overall image processing, which is undesirable.

Additionally, they lack the capability to reproject the images accurately due to the complex calculations that are required for depth calculation. Furthermore, the existing image processing apparatuses and techniques fail to maintain visual clarity, resulting in reduced image quality and discomfort, which hampers the immersive experience and may produce an undesirable outcome. Additionally, the existing image processing apparatuses struggle to adapt to users' visual acuity and perception, thereby limiting the realistic experience that the XR can offer.

Therefore, in the light of the foregoing discussion, there exists a need for imaging system to overcome the aforementioned drawbacks.

SUMMARY

The aim of the present disclosure is to provide an imaging system and a method for pass through using common an image sensor for colour and depth with an improved imaging system for extended reality (XR) applications with enhanced pass-through capabilities and an overall enriched XR experiences. The aim of the present disclosure is achieved by an imaging system and a method for imaging, where the method is implemented by an imaging system for pass through using common image sensor capable of capturing both colour and depth information, thereby enhancing the overall accuracy and efficiency of pass-through experiences. The reprojection of the obtained full-resolution colour data in accordance with the user's specific eye pose, not only streamlines the computational processes, but also contributes to an enhanced immersive and accurate representation of the user's surroundings in XR environments, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
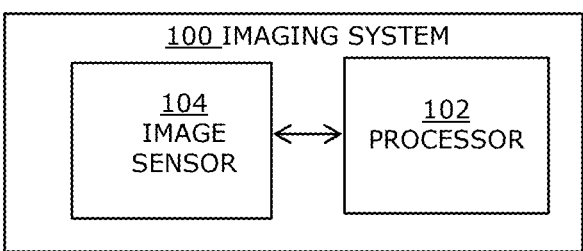
FIG. 1 is an illustration of an architecture of an imaging system for pass through using a common image sensor for colour and depth, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:

at least one image sensor comprising:

a plurality of photo-sensitive cells arranged on a photo-sensitive surface of the at least one image sensor; and a colour filter array comprising colour filters of at least three different colours, wherein the at least one image sensor has at least one of the following:

(a) the colour filter array further comprising colour filters that allow at least one infrared wavelength to pass through, (b) the plurality of photo-sensitive cells comprising phase detection autofocus (PDAF) photo-sensitive cells; and at least one processor configured to:

read out unprocessed colour data from those photo-sensitive cells that correspond to the colour filters of the at least three different colours;

generate coarse depth data by processing data read out from at least one of: those photo-sensitive cells that correspond to the colour filters that allow the at least one infrared wavelength to pass through the PDAF photo-sensitive cells;

perform interpolation and demosaicking on the unprocessed colour data and the coarse depth data, using at least one neural network, to generate a full-resolution colour data and a full-resolution depth data; and reproject the full-resolution colour data from a given camera pose to a given eye pose of a user, by utilising the full-resolution depth data.

In a second aspect, an embodiment of the present disclosure provides a method for imaging, the method being implemented in an imaging system, the method comprising:

reading out unprocessed colour data from photo-sensitive cells that correspond to colour filters of at least three different colours;

generating coarse depth data by processing data read out from at least one of: the photo-sensitive cells that correspond to the colour filters that allow at least one infrared wavelength to pass through phase detection autofocus (PDAF) photo-sensitive cells;

performing interpolation and demosaicking on the unprocessed colour data and the coarse depth data, using at least one neural network, to generate a full-resolution colour data and a full-resolution depth data; and reprojecting the full-resolution colour data from a given camera pose to a given eye pose of a user, by utilising the full-resolution depth data.

The present disclosure provides the aforementioned imaging system and the aforementioned method that is used to enhance the quality of extended reality (XR) experiences. The combination of interpolation and demosaicking techniques facilitated by neural networks, the aforementioned imaging system and the aforementioned method is used to generate a full-resolution colour data and full-resolution depth data. The full-resolution colour data refers to a complete and high-fidelity representation of colour information captured by the imaging system, while the full-resolution depth data represents a detailed and precise map of spatial distances within a scene captured by the imaging system. Subsequently, the reprojection of the full-resolution colour data guided by the full-resolution depth data, from a given camera pose to a user's eye pose, ensures an accurate and refined representation of the captured image. The integration of a colour filter array with filters of at least three different colours allows a comprehensive and detailed representation of the colour spectrum that is further used to capture rich and accurate colour information. Moreover, the utilization of a phase detection autofocus (PDAF) photo-sensitive cells enhances the precision of the full-resolution depth data generation by ensuring an accurate depth calculations, resulting in improved overall image quality. Additionally, the aforementioned imaging system and the aforementioned method uses the at least one neural network to generate a full-resolution colour data that allows an efficient image processing with reduced processing time and processing cost, especially in real-time applications, where quick image enhancement is required to maintain the fluidity and responsiveness of the virtual environment.

The term "imaging system" refers to a system for imaging a real-world environment. The imaging system may be used for imaging real-world environments for a variety of applications including but not limited to extended-reality (XR), inspection of the real-world environment, machine vision, gaming, art, and so forth. Notably, the imaging system is specialized equipment for capturing and processing visual information with unparalleled precision, making it particularly well-suited for immersive XR experiences, where the integration of accurate depth data and full-resolution colour information is important. The imaging system has applications in diverse fields such as inspection, leveraging its advanced features for detailed analysis and assessment of real-world scenes. Furthermore, the imaging system's capabilities extend to machine vision, enhancing the perception and understanding of visual data for automation and industrial applications. Notably, the imaging system enhances the quality of the captured image in real-time or near-real time.

Throughout the present disclosure, the term "at least one image sensor" refers to a device which detects light from a real-world environment at its photo-sensitive surface, when said light is incident thereupon. The image sensor comprises a plurality of photo-sensitive cells, which collectively form a photo-sensitive surface of the image sensor. The plurality of photo-sensitive cells includes phase detection autofocus (PDAF) photo-sensitive cells. Upon such detection of the light from the real-world environment, the plurality of photo-sensitive cells capture images for the real-world environment. The plurality of image signals are electrical signals pertaining to a real-world scene of the real-world environment. The plurality of image signals are processed (by an image signal processor or the at least one processor of the imaging system) to generate a digital image. A given photo-sensitive cell is known as a picture element, or a pixel. It will be appreciated that the plurality of photo-sensitive cells could be arranged in various ways (for example, such as a rectangular two-dimensional (2D) grid, a polygonal arrangement, a circular arrangement, an elliptical arrangement, a freeform arrangement, and similar) to form the photo-sensitive surface of the image sensor. In an implementation, the at least one image sensor also includes a stereo case. Examples of the image sensor may include, but are not limited to, a charge-coupled device (CCD) image sensor, and a complementary metal-oxide-semiconductor (CMOS) image sensor.

Throughout the present disclosure, the term "plurality of photo-sensitive cells" refers to specialized components that are arranged on a photo-sensitive surface of the at least one image sensor that is used to detect and convert the light from the surrounding environment into electrical signals, thereby allowing for the capture of spatial and colour information. Moreover, the plurality of photo-sensitive cells includes phase detection autofocus (PDAF) photo-sensitive cells. The PDAF operates by utilizing pairs of micro-lenses or pixels to detect phase differences in the light reaching the image sensor. The plurality of photo-sensitive cells assess the convergence or divergence of light rays, allowing the imaging system to determine the degree of focus required. The PDAF is particularly advantageous in dynamic scenarios, such as those encountered in extended reality (XR) applications, gaming, and other fast-paced environments, where swift and precise autofocus is essential for maintaining image clarity and quality. The integration of PDAF photo-sensitive cells in the imaging system contributes to improved overall performance, making it well-suited for applications that demand rapid and accurate autofocus functionality.

Throughout the present disclosure, the term "colour filter array" refers to a patterned arrangement of colour filters over the photo-sensitive surface of the at least one image sensor. The colour filters are strategically positioned to permit the selective transmission of light in specific wavelength ranges, corresponding to distinct colours. The colour filter array facilitates the capturing of the colour information by allowing only certain wavelengths to reach individual photo-sensitive cells.

In an implementation, the at least one image sensor has the colour filter array further comprising the colour filters that allow at least one infrared wavelength to pass through. In such an implementation, the at least one infrared wavelength to pass through encompasses various technologies for measuring depth in the imaging system. Examples of the various technologies for measuring depth in the imaging system include iTOF (Indirect Time-of-Flight), DTOF (Direct Time-of-Flight), SPAD (Single-Photon Avalanche Diode), and the like.

In another implementation, the at least one image sensor has the plurality of photo-sensitive cells comprising the PDAF photo-sensitive cells. In such an implementation, the PDAF photo-sensitive cells can be either fixed or dynamic. The fixed PDAF photo-sensitive cells mean that the PDAF photo-sensitive cells remain stationary, as is the case with conventional PDAF sensors where the photo-sensitive cells are permanently masked. The dynamic PDAF photo-sensitive cells are subject to change and occur when a dynamic masking is applied, typically achieved using a light valve device. In such an implementation, the plurality of photo-sensitive cells may also comprise non-PDAF photo-sensitive cells.

In yet another implementation, the at least one image sensor has the colour filter array further comprising the colour filters that allow at least one infrared wavelength to pass through, and the plurality of photo-sensitive cells comprising the PDAF photo-sensitive cells.

Throughout the present disclosure, the term "processor" refers to hardware, software, firmware, or a combination of these, suitable for controlling the operation of the imaging system. The at least one processor is communicably coupled with the at least one image sensor.

In this regard, the term "at least one processor" refers to "one processor" in some implementations, and "a plurality of processors" in other implementations. In some implementations, the at least one processor is implemented as a processor of the at least one image sensor. In other implementations, the at least one processor is implemented as the processor of the at least one image sensor and a processor of an external computing device, wherein the external computing device is communicably coupled with the at least one image sensor. In such a case, at least a part of all the aforementioned processing tasks of the at least one processor is performed at the processor of the external computing device. This considerably reduces processing burden on the processor of the image sensor. Examples of the at least one processor may include but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

Throughout the present disclosure, the term "unprocessed colour data" refers to an initial representation of the colour data captured by the at least one image sensor that has not undergone any form of manipulation, modification, or refinement. Optionally, the unprocessed colour data is in a form of coarse RAW colour data. In other words, the unprocessed colour data read by the at least one processor is in its raw and minimally processed state, characterized by its coarse resolution. The coarse RAW colour data preserves original sensor data, providing flexibility for subsequent processing steps to refine and optimize the colour information as needed for specific applications, such as extended reality, gaming, or machine vision. In an implementation, the unprocessed data includes a data in a data format that is different from the conventional RAW image format in some RGB-Z sensors. Moreover, the at least one processor reads out unprocessed colour data from those photo-sensitive cells that correspond to the colour filters of the at least three different colours.

The at least three different colours are part of the colour filter array. The at least three different colours refer to a patterned arrangement strategically designed on the photo-sensitive surface of the image sensor. In such an implementation, the three different colours of the colour filter array comprise: at least one blue colour filter, at least one green colour filter, and at least one red colour filter. It is hereby noted that the three different colours of the colour filter array may also comprise at least two green colour filters, similar to a standard Bayer Colour Filer Array (CFA). In another implementation, the three different colours of the colour filter array comprise: at least one cyan colour filter, at least one magenta colour filter, and at least one yellow colour filter. It is hereby noted that the three different colours of the colour filter array may also comprise at least two magenta colour filters.

In this regard, the at least one processor reads out the unprocessed colour data by accessing and extracting raw colour information directly from the photo-sensitive cells. The photo-sensitive cells are positioned in pattern with the three different colours of the colour filter array, allowing the at least one processor to read the unprocessed data representing different colour channels captured by the at least one image sensor. The technical effect of the reading out the unprocessed colour data from the photo-sensitive cells corresponding to colour filters of at least three different colours is to facilitate the generation of accurate and detailed colour representations in the final captured images. As a result, the selective reading out of the unprocessed data from specific photo-sensitive cells associated with the three different colour filters allows capturing of a broad spectrum of colour details present in the real-world environment. The reading out of the unprocessed colour data is useful for achieving high-fidelity colour reproduction and is essential for applications such as extended reality, machine vision, gaming, and other contexts where precise colour information is crucial for an immersive and authentic visual experience.

The at least one processor is configured to generate coarse depth data by processing data read out from at least one of: those photo-sensitive cells that correspond to the colour filters that allow the at least one infrared wavelength to pass through the PDAF photo-sensitive cells. Herein, the term "coarse depth data" represents a preliminary, generalized estimation of the spatial distances within a captured image, derived from processing information obtained from specific photo-sensitive cells, including those sensitive to infrared wavelengths and phase detection autofocus (PDAF) capabilities. In an implementation, to generate the coarse depth data, the at least one processor is configured to analyse the data obtained from the photo-sensitive cells. For the photo-sensitive cells associated with colour filters allowing infrared wavelengths, the at least one processor leverages a specific spectral information to contribute to the depth estimation process. In another implementation, the PDAF photo-sensitive cells, designed for determining focus variations, generates the coarse depth data. In an implementation, the at least one processor processes the data from the photo-sensitive cells and the PDAF photo-sensitive cells collectively to generate the coarse depth data. In another implementation, the at least one processor processes the data from the photo-sensitive cells and the PDAF photo-sensitive cells individually to generate the coarse depth data. The technical effect of incorporating the data from the photo-sensitive cells and PDAF capabilities for generating the coarse depth data is to enhance the accuracy of depth data generation. The coarse depth data is essential for applications such as precise focus adjustments and the creation of 3D representations. The inclusion of the photo-sensitive cells and the PDAF photo-sensitive cells in the coarse depth generation process contributes to the imaging system's ability to capture detailed and spatially accurate information about the real-world environment.

The at least one processor is configured to perform interpolation and demosaicking on the unprocessed colour data and the coarse depth data, using at least one neural network, to generate a full-resolution colour data and a full-resolution depth data. Herein, the term "interpolation" refers to a computational method that fills in missing details in the unprocessed colour data and the coarse depth data where raw data is unavailable, enhancing resolution. The term "demosaicking" refers to a process that reconstructs the complete colour information by extrapolating from the unprocessed colour data and the coarse depth data, refining the overall image quality. The at least one processor utilizes at least one neural network, a sophisticated computational model, to perform the interpolation and the demosaicking. The at least one neural networks enables the generation of high-quality, full-resolution colour and depth data from the unprocessed colour data and the coarse depth data. The technical effect of leveraging at least one neural networks is to enhance the quality and accuracy of both colour and depth data, contributing to a more immersive and authentic visual experience to a user. The utilization of the at least one neural networks elevates the imaging system's capabilities, allowing it to adaptively process the unprocessed colour data and the coarse depth data and produce the full-resolution colour data and the full-resolution depth data that faithfully represents the intricacies of the real-world environment.

Optionally, the interpolation and the demosaicking is performed on the coarse depth data, based on at least one of: the unprocessed colour data, the full-resolution colour data. In an implementation, the interpolation and the demosaicking are performed on the coarse depth data relying on the unprocessed colour data. In another implementation, the interpolation and the demosaicking are performed on the coarse depth data relying on the full-resolution colour data. In yet another implementation, the interpolation and the demosaicking are performed on the coarse depth data relying on the unprocessed colour data and the full-resolution colour data. The unprocessed colour data and the full-resolution colour data provide additional context and information to refine the depth representation. The technical effect of performing interpolation and demosaicking on the coarse depth data, guided by the unprocessed colour data and the full-resolution colour data, is to enhance the precision and completeness of depth map. The technical effect of incorporating data from both the unprocessed colour data and full-resolution colour data, is to achieve a more accurate and detailed spatial understanding of the real-world scene. The depth map ensures that the reconstructed visual content aligns seamlessly with the user's perspective, ultimately contributing to an improved and more realistic visual experience in applications such as extended reality.

Optionally, the interpolation and the demosaicking is performed on the unprocessed colour data, based on the coarse depth data. In an implementation, the interpolation and the demosaicking are performed on the unprocessed colour data, relying on the coarse depth data as a reference. The interpolation and the demosaicking are guided by information from the coarse depth data, providing context for refining the colour representation. The interpolation and demosaicking employ algorithms that leverage the relationship between colour and depth to generate a more detailed and accurate visual output. The technical effect of incorporating information from the coarse depth data, is to achieve a more comprehensive understanding of the visual scene, contributing to a visually accurate and detailed representation.

Optionally, the at least one neural network has a first path and a second path that are employed to perform the interpolation and the demosaicking on the unprocessed colour data and the coarse depth data, respectively. In an implementation, the first path is employed for performing the interpolation and the demosaicking on the unprocessed colour data. In another implementation, the second path is employed for performing the interpolation and the demosaicking on the coarse depth data. The first path and the second path neural network architecture ensures specialized processing for each type of data i.e. the unprocessed colour data and the coarse depth data, optimizing the refinement of both the unprocessed colour data and the coarse depth data in the imaging system.

Optionally, the first path and the second path are parallel paths, wherein the first path and the second path are configured to share at least one of:

(i) the unprocessed colour data from the first path to the second path, (ii) the coarse depth data from the second path to the first path, (iii) interpolated colour data, generated after performing the interpolation on the unprocessed colour data, from the first path to the second path, (iv) interpolated depth data, generated after performing the interpolation on the coarse depth data, from the second path to the first path, (v) the full-resolution colour data from the first path to the second path, (vi) the full-resolution depth data from the second path to the first path.

In other words, the first path and the second path within the at least one neural network operate as parallel pathways, facilitating specialized processing for distinct functions and sharing information with each other. In this regard, when processing the data, such as the unprocessed data, the coarse depth data, the interpolated colour data, the interpolated depth data, the full-resolution colour data, and the full-resolution depth data via the first path and the second path, respectively, the first path and the second path could share at least one of the aforesaid forms of data with each other. The technical benefit of such sharing is that corresponding data can be accurately and conveniently processed in a computationally-efficient and time-efficient manner, in order to generate the image in real time or near-real time. Such a sharing may also be referred to as cross-view of features between the first path and the second path.

It will be appreciated that sharing at least one of the aforesaid forms of image data between the first path and the second path could be implemented by employing attention modules in the first path and the second path. The attention modules allow the at least one neural network to selectively share and fuse the aforesaid forms of image data between the first path and the second path. The attention modules in neural networks are well-known in the art.

In an implementation, the first path and the second path are configured to share the unprocessed colour data from the first path to the second path. In other words, the unprocessed colour data read by the at least one processor from the photo-sensitive cells is shared from the first path to the second path of the at least one neural network. The technical effect of sharing the unprocessed colour data is to ensure that the second path, responsible for interpolation and demosaicking on the coarse depth data, has access to the most authentic and raw colour information and hence contributes to a more accurate and high-quality colour reconstruction.

In another implementation, the first path and the second path are configured to share the coarse depth data from the second path to the first path. In other words, the coarse depth generated by the at least one processor by processing the data read out from the photo-sensitive cells, is shared from the second path to the first path of the at least one neural network. The technical effect of sharing the coarse depth data with the first path, is to ensure that the interpolation and demosaicking of the unprocessed colour data, benefits from contextual depth information, contributing to a more accurate and detailed interpretation of colour data in regions where depth plays a crucial role.

In yet another implementation, the first path and the second path are configured to share the interpolated colour data, generated after performing the interpolation on the unprocessed colour data from the first path to the second path. The first path, responsible for interpolation on unprocessed colour data, produces interpolated colour information. The interpolated colour data is then shared with the second path for further processing. The technical effect of sharing the interpolated colour data, is to ensure that the second path, focused on the interpolation and the demosaicking on the coarse depth data, benefits from refined colour information contained within the interpolated colour data, contributing to a more accurate and visually appealing colour representation.

In another implementation, the first path and the second path are configured to share the interpolated depth data generated after performing the interpolation on the coarse depth data from the second path to the first path. The second path, responsible for the interpolation and demosaicking on the coarse depth data, produces the interpolated depth information. The interpolated depth information is then shared with the first path for further processing. The technical effect of sharing the interpolated depth data, is to ensure that the first path, engaged in refining the unprocessed colour data, benefits from a more nuanced and detailed depth representation, contributing to improved spatial accuracy.

In yet another implementation, the first path and the second path are configured to share the full-resolution colour data from the first path to the second path. The first path, responsible for generating full-resolution colour data, shares the full-resolution colour data with the second path. The technical effect of sharing full-resolution colour data, is to ensure that the second path, engaged in the interpolation and the demosaicking on the coarse depth data, benefits from the highest level of colour detail contained within the full-resolution colour data, contributing to an enhanced and visually precise colour representation.

In another implementation, the first path and the second path are configured to share the full-resolution depth data from the second path to the first path. The second path, responsible for generating the full-resolution depth data, shares the full-resolution depth data with the first path. The technical effect of sharing the full-resolution depth data, is to ensure that the first path, focused on refining the unprocessed colour data, benefits from the most detailed depth representation contained within the full-resolution depth data. This contributes to optimal spatial accuracy, particularly crucial for immersive and realistic visual experiences of the user.

The at least one processor reprojects the full-resolution colour data from a given camera pose to a given eye pose of a user, by utilising the full-resolution depth data. In other words, the at least one processor in the imaging system that undertakes the task of reprojection, involving the transformation of full-resolution colour data captured from a given camera pose to align with a given eye pose of the user. The reprojection is executed by leveraging the full-resolution depth data obtained from the imaging system. The at least one processor utilizes the coarse depth data to calculate the spatial relationships between the given camera pose and the user's given eye pose. Using the spatial relationship, the at least one processor adjusts the full-resolution colour data to match the user's perspective, ensuring that the visual content is accurately aligned with the user's intended viewpoint. The technical effect of aligning the given camera pose with the user's given eye pose, is to enhance the realism and accuracy of the displayed content in applications such as extended reality. The reprojection ensures that the visual information corresponds precisely to the user's perspective, contributing to a more authentic and engaging user experience in various contexts, including virtual and augmented reality scenarios.

Optionally, the unprocessed colour data is in a form of coarse RAW colour data, while the full-resolution colour data is in a form of dense RAW colour data. In other words, the full-resolution colour data, generated by the at least one processor by performing the interpolation and the demosaicking on the unprocessed colour data and the coarse depth data, is in a form of the dense RAW colour data, as converted from the coarse RAW colour data of the unprocessed colour data. The conversion of the coarse (subsampled) RAW colour data to the dense RAW colour data allows for a nuanced training of the at least one neural networks, particularly emphasizing denoising through minimization of noise-related losses. Further, after denoising, tone mapping, specifically gamma correction, is applied to the dense RAW colour data for adjusting brightness and contrast to enhance visual details of the dense RAW colour data to form dense RGB data. Subsequently, the dense RGB data undergoes final fusion after the reprojection and disocclusion filtering. The at least one neural network utilized in the final fusion shapes dense RGB data and adds further enhancements. The further enhancements leverage suitable loss functions and training sets composed of high-quality RGB images. Thus, the imaging system generates high quality VST (Virtual Stereoscopic Transparency) images for the human vision system from stereo images captured at a novel viewpoint, emphasizing a meticulous processing pipeline guided by the at least one neural network-based refinement techniques. Thus, the imaging system ensures both enhanced visual detail and an accurate representation of the stereo scene.

The imaging system ensures heightened accuracy in the fusion and generation of the full-resolution depth data, providing a more faithful representation of spatial characteristics within captured scenes. The imaging system eliminates the need for RGB-converted input images, streamlining the process by bypassing Image Signal Processing (ISP) for depth determination. Moreover, the imaging system facilitates the optimal distribution of operations in the image signal processing pipeline, enhancing overall performance. The imaging system can seamlessly operate on both subsampled and raw data, catering to diverse imaging scenarios. The imaging system efficiently utilizes RAW colour data for depth determination, recognizing the advantages of avoiding unnecessary enhancements designed for human vision. The imaging system delivers precision, efficiency, adaptability, and strategic optimization in stereo-dense depth data fusion and generation.

The present disclosure also relates to the method as described above. Various embodiments and variants disclosed above, with respect to the aforementioned imaging system, apply mutatis mutandis to the method.

Optionally, the interpolation and the demosaicking is performed on the coarse depth data, based on at least one of: the unprocessed colour data, the full-resolution colour data. The technical effect of performing interpolation and demosaicking on the coarse depth data, guided by the unprocessed colour data and the full-resolution colour data, is to enhance the precision and completeness of depth map. The technical effect of incorporating data from both the unprocessed colour data and full-resolution colour data, is to achieve a more accurate and detailed spatial understanding of the real-world scene.

Optionally, the unprocessed colour data is in a form of coarse RAW colour data, while the full-resolution colour data is in a form of dense RAW colour data. The technical effect of acquiring the unprocessed colour data in form of the coarse RAW colour data is that the coarse RAW colour data preserves original sensor data, providing flexibility for subsequent processing steps to refine and optimize the colour information as needed for specific applications, such as extended reality, gaming, or machine vision. The technical effect of acquiring the full-resolution colour data in the form of the dense RAW colour data is that the dense RAW colour data allows for a nuanced training of the at least one neural networks, particularly emphasizing denoising through the minimization of noise-related losses.

Optionally, the interpolation and the demosaicking is performed on the unprocessed colour data, based on the coarse depth data. The technical effect of incorporating information from the coarse depth data while performing the interpolation and the demosaicking on the unprocessed colour data, is to achieve a more comprehensive understanding of the visual scene, contributing to a visually accurate and detailed representation.

Optionally, the at least one neural network has a first path and a second path that are employed to perform the interpolation and the demosaicking on the unprocessed colour data and the coarse depth data, respectively. The technical effect of employing the first path and the second path in performing the interpolation and the demosaicking on the unprocessed colour data and the coarse depth data, is that the first path and the second path neural network architecture ensures specialized processing for each type of data i.e. the unprocessed colour data and the coarse depth data, optimizing the refinement of both the unprocessed colour data and the coarse depth data in the imaging system.

Optionally, the first path and the second path are parallel paths, wherein the first path and the second path are configured to share at least one of:

(i) the unprocessed colour data from the first path to the second path, (ii) the coarse depth data from the second path to the first path, (iii) interpolated colour data, generated after performing the interpolation on the unprocessed colour data, from the first path to the second path, (iv) interpolated depth data, generated after performing the interpolation on the coarse depth data, from the second path to the first path, (v) the full-resolution colour data from the first path to the second path, (vi) the full-resolution depth data from the second path to the first path.

The technical benefit of such sharing is that corresponding data can be accurately and conveniently processed in a computationally-efficient and time-efficient manner, for generating the image in real time or near-real time. Such a sharing may also be referred to as cross-view of features between the first path and the second path of the at least one neural network.

DETAILED DESCRIPTION OF THE DRAWINGS

Referring to FIG. 1, there are shown illustrations of an architecture of an imaging system for pass through using a common image sensor for colour and depth, in accordance with an embodiment of the present disclosure. With reference to FIG. 1, there is shown an imaging system 100. The imaging system 100 comprises at least one image sensor 104, and at least one processor 102. The at least one processor 102 is communicably coupled to the image sensor 104 and is configured to perform the aforementioned operations, as described earlier with respect to the aforementioned first aspect.

It may be understood by a person skilled in the art that FIG. 1 includes a simplified architecture of the imaging system 100, for the sake of clarity, which should not unduly limit the scope of the claims herein. It is to be understood that the specific implementation of the imaging system 100 is provided as an example and is not to be construed as limiting it to specific numbers or types of servers, display apparatuses, and congestion control network devices. The person skilled in the art will recognize many variations, alternatives, and modifications of embodiments of the present disclosure.

Figure 2:
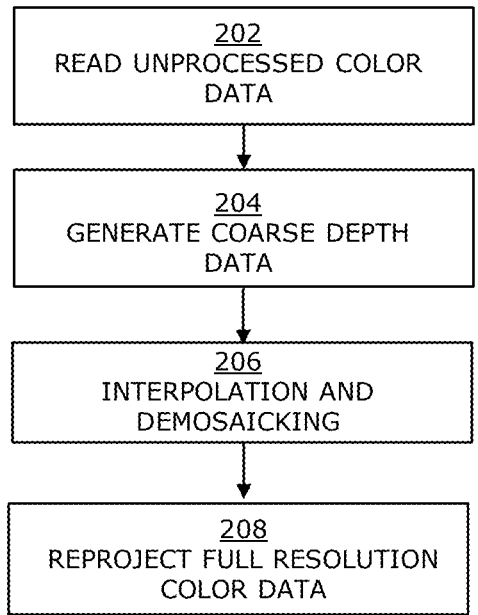
FIG. 2 is an illustration of steps of a method for pass through using a common image sensor for colour and depth implemented by the imaging system, in accordance with an embodiment of the present disclosure.

Referring to FIG. 2, illustrated are steps of a method for imaging, in accordance with an embodiment of the present disclosure. The method is implemented by the imaging system 100 comprising the image sensor 104, and the at least one processor 102. At step 202, an unprocessed colour data is read out from photo-sensitive cells that correspond to colour filters of at least three different colours. At step 204, a coarse depth data is generated by processing data read out from at least one of: the photo-sensitive cells that correspond to the colour filters that allow at least one infrared wavelength to pass through phase detection autofocus (PDAF) photo-sensitive cells. At step 206, interpolation and demosaicking is performed on the unprocessed colour data and the coarse depth data, using at least one neural network, to generate a full-resolution colour data and a full-resolution depth data. At step 208, the full-resolution colour data is reprojected from a given camera pose to a given eye pose of a user, by utilising the full-resolution depth data.

The aforementioned steps are only illustrative and other alternatives can also be provided where one or more steps are added, one or more steps are removed, or one or more steps are provided in a different sequence without departing from the scope of the claims.

Figure 3:
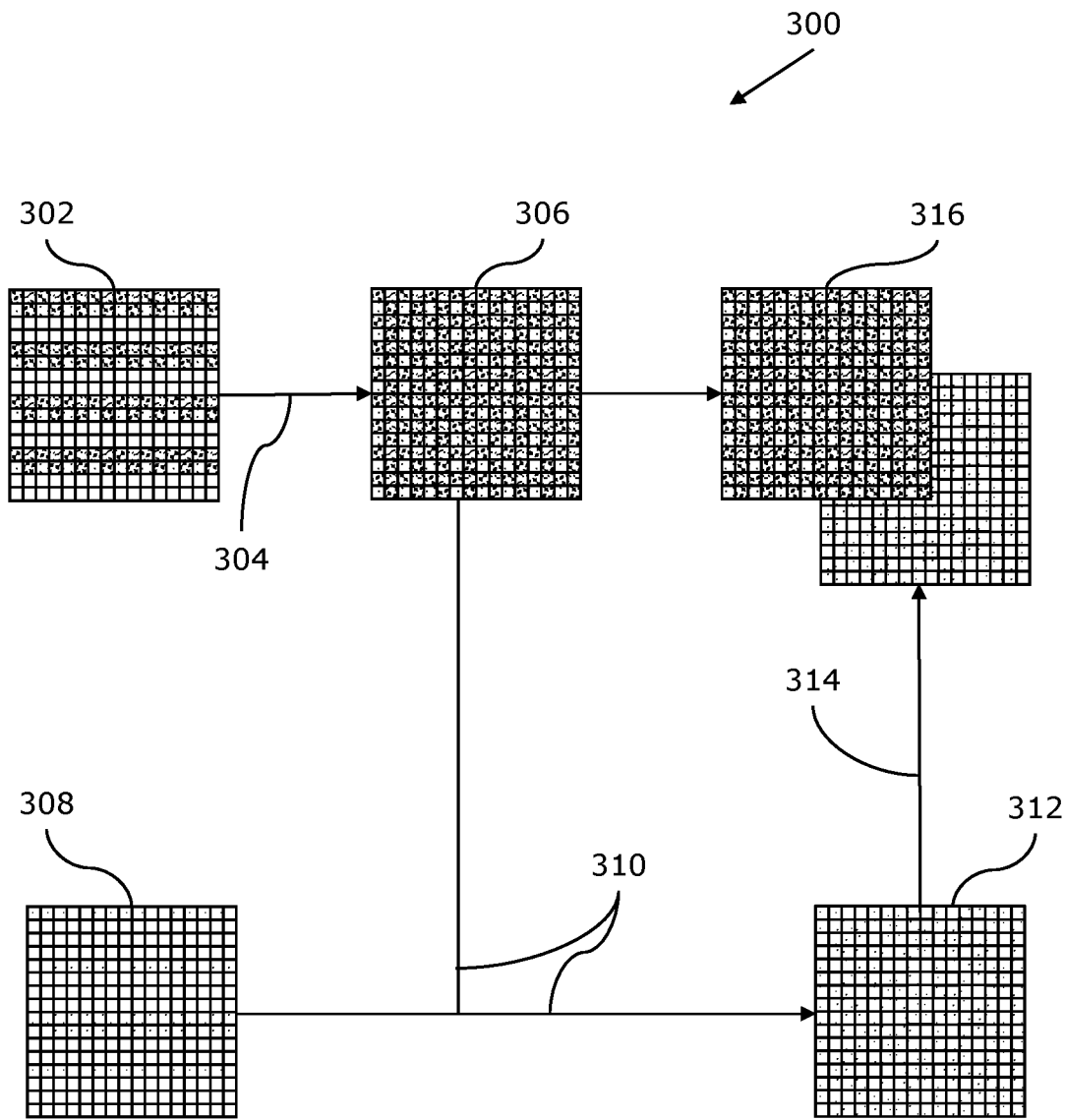
FIG. 3 is an exemplary diagram that depicts a pass through using common image sensor for colour and depth, in accordance with an embodiment of the present disclosure.

Referring to FIG. 3, there is shown an exemplary diagram that depicts a pass through using a common image sensor for colour and depth. FIG. 3 is described in conjunction with elements from FIG. 1. With reference to FIG. 3, there is shown an exemplary diagram 300 that includes data and operations from 302 to 316 to reprojecting a full-resolution colour data from a given camera pose to a given eye pose of a user, by utilising a full-resolution depth data.

At operation 304, an unprocessed colour data 302, that is read out from photo-sensitive cells that correspond to the colour filters of the at least three different colours, is processed to generate a full full-resolution colour data 306. In particular, at operation 304, interpolating and demosaicking are performed on the unprocessed colour data 302 to generate the full full-resolution colour data 306. Further, a coarse depth data 308 is generated by processing data read out from at least one of:

those photo-sensitive cells that correspond to the colour filters that allow the at least one infrared wavelength to pass through the PDAF photo-sensitive cells. At operation 310, a full-resolution depth data 312 is generated by performing the interpolating and the demosaicking on the coarse depth data 308. Further, at operation 310, the full-resolution colour data 306 is also utilized for the generation of the full-resolution depth data 312. At operation 314, the full-resolution depth data 312 is utilized to reproject the full-resolution colour data 306 from a given camera pose to a given eye pose of a user. As a result, a reprojected image 316 is shown to the user.

FIG. 3 is merely an example, which should not unduly limit the scope of the claims herein. A person skilled in the art will recognize many variations, alternatives, and modifications of embodiments of the present disclosure.

The invention claimed is:

1. An imaging system comprising:

at least one image sensor comprising:

a plurality of photo-sensitive cells arranged on a photo-sensitive surface of the at least one image sensor; and a colour filter array comprising colour filters of at least three different colours, wherein the at least one image sensor has at least one of the following:

(a) the colour filter array further comprising colour filters that allow at least one infrared wavelength to pass through, or (b) the plurality of photo-sensitive cells comprising phase detection autofocus (PDAF) photo-sensitive cells; and at least one processor configured to:

read out unprocessed colour data from photo-sensitive cells of the plurality of photo-sensitive cells that correspond to the colour filters of the at least three different colours;

generate coarse depth data by processing data read out from at least one photo-sensitive cell of the plurality of photo-sensitive cells that corresponds to the colour filters that allow the at least one infrared wavelength to pass through the PDAF photo-sensitive cells;

perform interpolation and demosaicking on the unprocessed colour data and the coarse depth data, using at least one neural network, to generate a full-resolution colour data and a full-resolution depth data; and reproject the full-resolution colour data from a given camera pose to a given eye pose of a user, by utilising the full-resolution depth data.

2. The imaging system of claim 1, wherein the interpolation and the demosaicking is performed on the coarse depth data, based on at least one of: the unprocessed colour data, or the full-resolution colour data.

3. The imaging system of claim 1, wherein the unprocessed colour data is in a form of coarse RAW colour data, while the full-resolution colour data is in a form of dense RAW colour data.

4. The imaging system of claim 1, wherein the interpolation and the demosaicking is performed on the unprocessed colour data, based on the coarse depth data.

5. The imaging system of claim 1, wherein the at least one neural network has a first path and a second path that are employed to perform the interpolation and the demosaicking on the unprocessed colour data and the coarse depth data, respectively.

6. The imaging system of claim 5, wherein the first path and the second path are parallel paths, wherein the first path and the second path are configured to share at least one of:

(i) the unprocessed colour data from the first path to the second path, (ii) the coarse depth data from the second path to the first path, (iii) interpolated colour data, generated after performing the interpolation on the unprocessed colour data, from the first path to the second path, (iv) interpolated depth data, generated after performing the interpolation on the coarse depth data, from the second path to the first path, (v) the full-resolution colour data from the first path to the second path, or (vi) the full-resolution depth data from the second path to the first path.

7. A method for imaging, the method being implemented in an imaging system comprising at least one image sensor and at least one processor, the method comprising:

reading out unprocessed colour data from photo-sensitive cells that correspond to colour filters of at least three different colours;

generating coarse depth data by processing data read out from at least one of: the photo-sensitive cells that correspond to the colour filters that allow at least one infrared wavelength to pass through phase detection autofocus (PDAF) photo-sensitive cells;

performing interpolation and demosaicking on the unprocessed colour data and the coarse depth data, using at least one neural network, to generate a full-resolution colour data and a full-resolution depth data; and reprojecting the full-resolution colour data from a given camera pose to a given eye pose of a user, by utilising the full-resolution depth data.

8. The method of claim 7, wherein the interpolation and the demosaicking is performed on the coarse depth data, based on at least one of: the unprocessed colour data, or the full-resolution colour data.

9. The method of claim 7, wherein the unprocessed colour data is in a form of coarse RAW colour data, while the full-resolution colour data is in a form of dense RAW colour data.

10. The method of claim 7, wherein the interpolation and the demosaicking is performed on the unprocessed colour data, based on the coarse depth data.

11. The method of claim 7, wherein the at least one neural network has a first path and a second path that are employed to perform the interpolation and the demosaicking on the unprocessed colour data and the coarse depth data, respectively.

12. The method of claim 11, wherein the first path and the second path are parallel paths, wherein the first path and the second path are configured to share at least one of:

(i) the unprocessed colour data from the first path to the second path, (ii) the coarse depth data from the second path to the first path, (iii) interpolated colour data, generated after performing the interpolation on the unprocessed colour data, from the first path to the second path, (iv) interpolated depth data, generated after performing the interpolation on the coarse depth data, from the second path to the first path, (v) the full-resolution colour data from the first path to the second path, or (vi) the full-resolution depth data from the second path to the first path.

* * * * *